United States Patent
Maus

(10) Patent No.: US 8,800,877 B2
(45) Date of Patent: Aug. 12, 2014

(54) RFID REPORTING PERSONAL HEALTH CARD AND RELATED SYSTEMS

(75) Inventor: Christopher T. Maus, Sandpoint, ID (US)

(73) Assignee: Lifenexus, Inc., San Francisco, CA (US)

( * ) Notice: Subject to any disclaimer, the term of this patent is extended or adjusted under 35 U.S.C. 154(b) by 0 days.

(21) Appl. No.: 13/305,705

(22) Filed: Nov. 28, 2011

(65) Prior Publication Data
US 2012/0161934 A1 Jun. 28, 2012

Related U.S. Application Data

(63) Continuation of application No. 11/925,215, filed on Oct. 26, 2007, now Pat. No. 8,066,192.

(60) Provisional application No. 60/854,493, filed on Oct. 26, 2006.

(51) Int. Cl.
*G06K 19/06* (2006.01)

(52) U.S. Cl.
USPC ............................ 235/492; 235/380; 235/487

(58) Field of Classification Search
USPC ................ 235/380, 487, 492, 493; 340/572.1
See application file for complete search history.

(56) References Cited

U.S. PATENT DOCUMENTS

| | | | |
|---|---|---|---|
| 6,747,561 B1 * | 6/2004 | Reeves | 340/573.1 |
| 7,004,385 B1 * | 2/2006 | Douglass | 235/379 |
| 2004/0203352 A1 * | 10/2004 | Hall et al. | 455/41.1 |
| 2004/0232219 A1 * | 11/2004 | Fowler | 235/380 |
| 2004/0255081 A1 * | 12/2004 | Arnouse | 711/115 |
| 2006/0055620 A1 * | 3/2006 | Oliver et al. | 343/876 |
| 2007/0046476 A1 * | 3/2007 | Hinkamp | 340/573.1 |
| 2008/0088436 A1 * | 4/2008 | Reeves et al. | 340/539.12 |

* cited by examiner

*Primary Examiner* — Michael G Lee
*Assistant Examiner* — Tabitha Chedekel
(74) *Attorney, Agent, or Firm* — Fenwick & West LLP

(57) ABSTRACT

A personal health card that includes a smartcard with an RFID device that automatically reports certain RFID response information when illuminated by an interrogation signal from an RFID reader, such as an authorized first responder interrogation device issued to police, fire, lifeguard, or EMT personnel. A characteristic of the response from a selected card may change in response to the strength of the signal received from the card to help the operator locate and recover a desired card. For example, the volume of an audible "ping" at the interrogator may become louder or more frequent as the interrogation response from the card becomes stronger to provide a "homing device" for physically locating a particular card. This feature is very helpful when emergency responses are attempting to locate personal health cards at the scene of an accident or other incident.

10 Claims, 5 Drawing Sheets

RFID REPORTING PERSONAL HEALTH CARD AND RELATED SYSTEMS

REFERENCE TO RELATED APPLICATIONS

This Application is a continuation of U.S. patent application Ser. No. 11/925,215, filed on Oct. 26, 2007, now U.S. Pat. No. 8,066,192 which claims priority to U.S. Provisional Patent Application Ser. No. 60/854,493 entitled "Personal Health Card and Related Systems" filed Oct. 26, 2006.

REFERENCE TO INCORPORATED MATERIAL

This application also incorporates by reference U.S. Pat. No. 7,092,891 entitled "Secure Medical Records Maintenance System"; co-pending U.S. patent application Ser. No. 09/892,184 entitled "Mobile Data Management System", and U.S. patent application Ser. No. 09/799,479 entitled "Computerized Information Processing and Retrieval System."

TECHNICAL FIELD

The present invention relates to smartcards used for health insurance, medical data and financial transactions and, more specifically, to a multi-purpose personal health card with RFID information reporting functionality.

BACKGROUND OF THE INVENTION

The present invention represents an improvement that may be used in connection with systems described U.S. Pat. No. 7,092,891 entitled "Secure Medical Records Maintenance System" ("the 891 patent") and co-pending U.S. patent application Ser. No. 09/892,184 entitled "Mobile Data Management System" (the 184 application"). The 891 patent describes a hand-held health monitoring device, such as a blood cholesterol testing meter, that works with a smartcard and a dual-server, secure medical records maintenance system. The 891 patent also describes a financial system in which the patient can use the smartcard to pay for tests provided by the health monitoring device. The 184 application describes a medical data handling system in which a patient's personal and emergency medical treatment information, including insurance information, is stored on a smartcard that is carried by the patient. In an emergency situation, the smartcard is read by a card reader carried on an ambulance, and the information carried on the card is transmitted to the hospital while the patient is in transit to the hospital. Medical readings, treatment applied to the patient, and observations by the EMT personnel during the transport are also recorded on the smartcard and transmitted to the hospital while the while the patient is in transit to the hospital. This allows the hospital to prepare an admission report in advance of the patient's arrival to facilitate the admission process once the patient arrives.

In view of the forgoing systems that aid in the medical treatment of the patient, the smartcard carried by the patient is expected to become a very important piece of equipment. Accordingly, there is an ongoing need for cost effective technologies to improve the functionality and ease of use of the smartcards and associated systems. Of course, medical and financial information is very sensitive and needs to be handled with a high degree of security. At the same time, the patients can benefit from a high degree of functionality and consolidation of that functionality on a single, secure instrument.

SUMMARY OF THE INVENTION

The present invention meets the needs described above in personal health card that includes a smartcard with a number of sophisticated technologies. One important feature of the personal health card is an RFID device carried by the card that automatically reports certain RFID response information when illuminated by an interrogation signal from an RFID reader, such as an authorized first responder interrogation device issued to police, fire, lifeguard, or EMT personnel. The RFID response information may be as minimal as a visible or audible "ping" response displayed or played on the RFID interrogator indicating that a personal health card has been interrogated. If multiple cards respond to the interrogator, the RFID interrogator can be used to select among the responding cards so that the operator can investigate one card at a time. A characteristic of the response from a selected card may change in response to the strength of the signal received from the card to help the operator locate and recover a desired card. For example, the volume of an audible "ping" at the interrogator may become louder or more frequent as the interrogation response from the card becomes stronger to provide a "homing device" for physically locating a particular card. This feature is very helpful when emergency response is attempting to locate personal health cards at the scene of an accident or other incident.

The "ping" response is accompanied by identification and other information regarding the owner of the personal health card, which is accessed remotely by the RFID reader without the need to physically locate and handle the card. In particular, the identification information may include a photo ID, physical description, emergency treatment information (e.g., medical conditions, allergies, blood type, drug prescriptions, etc.), and language spoken by the owner of the card. The interrogator is configured to select a particular card among a number of responding cards, play or display a homing "ping" response for the selected card, and display identification information for the owner of the selected card, such as the owner's photo ID. Obtaining this information with an authorized first responder interrogation device allows an appropriate emergency responder, such as police, fire, lifeguard, or EMT personnel, to locate the correct card for a particular person, such as an injured person, from a distance without having to open purses or wallets to find and inspect a variety of cards to locate the correct card. The reporting feature of the card also allows the operator of the RFID reader to quickly obtain relevant information about the owner of the card, such as emergency treatment information, which may be critically important at the location of an injury or accident.

DETAILED DESCRIPTION OF THE EMBODIMENTS

Figure 1:
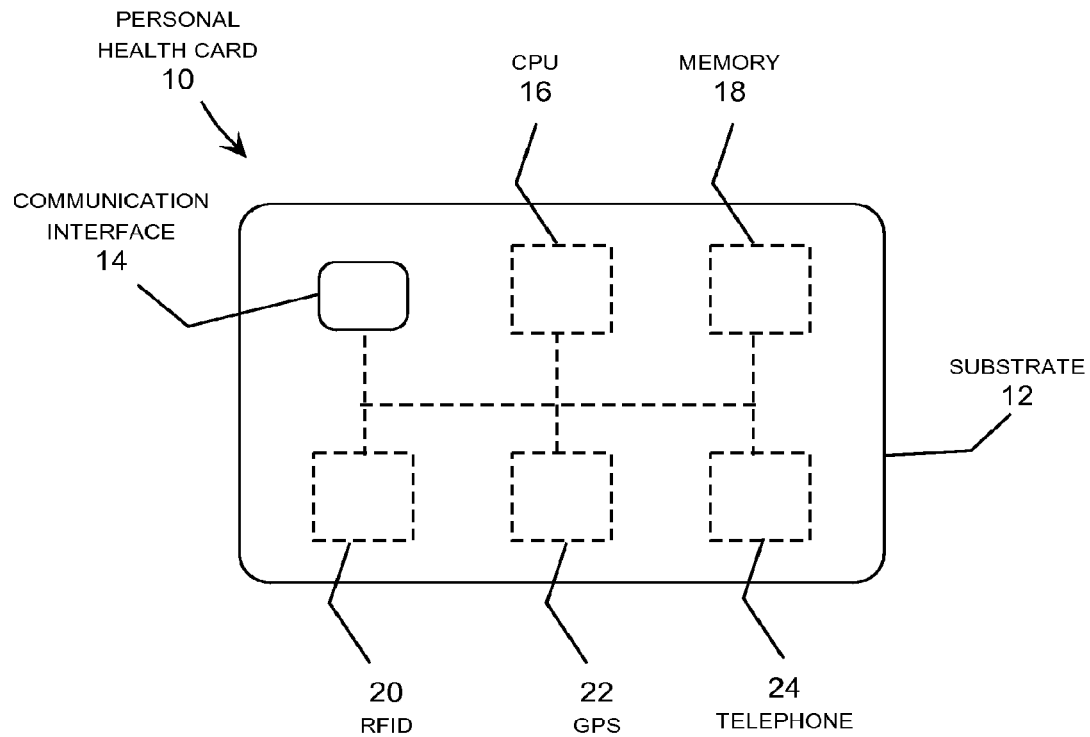
FIG. 1 is a conceptual illustration of a personal health card that includes a communication interface, a CPU, a memory, and RFID circuit, a GPS circuit, and a mobile telephone circuit.
Figure 2:
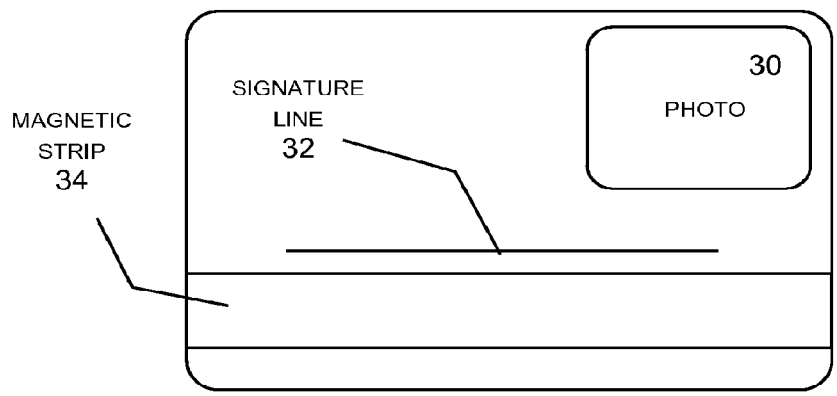
FIG. 2 is conceptual illustration of the opposite side of the personal health card of FIG. 1, which includes a photo ID, a signature line, and a magnetic strip for engaging in financial transactions.

The present invention may be embodied in a multi-purpose personal health card and related systems. FIG. 1 is a conceptual illustration of a particular example of the personal health card 10 that includes a wallet-sized plastic substrate 12 carrying communication interface 14, a CPU 16, a memory 18, an RFID circuit 20, a GPS circuit 22, and a mobile telephone circuit 24. The card may also carry a small battery to power occasional use of the GPS and telephone circuits. FIG. 2 shows the opposite side of the personal health card, which includes a photo ID 30, a signature line 32, and a magnetic strip 34 for engaging in financial transactions. The personal health card also typically includes an embossed account number, hologram, and other indicia carried on conventional credit and debit cards. Of course, the personal health card need not include all of these features, and may include additional features, as deemed appropriate for a particular application. Nevertheless, it will be appreciated that those features shown in FIG. 1 provide a powerful tools for implementing a new and greatly improved paradigm in personal health care management and insurance.

The communication interface 14, CPU 16, and memory 18 allow the personal health card to function as a standard smartcard, as that functionality may develop in the future. The photo ID 30, a signature line 32, magnetic strip 34 and embossed number on the card allow the personal health card to function as a health insurance card as well as a standard financial instrument, such as a credit card, debit card, stored value card, prepaid value card, or a combination of these types of financial instruments. The GPS circuit 22 allows the personal health card to keep track of its own location and provide that information as desired, for example through the on-board mobile telephone circuit 24. The combination of the GPS circuit 22 and the mobile telephone circuit 24 allows the card to be accessed, tracked, activated, deactivated, programmed, updated and controlled remotely. This provides a powerful set of tools for remotely responding to loss or theft of the card, changes in financial limits or balances, and changes in insurance status, insurance policy coverage, and other insurance adjudication and fulfillment information over time.

The personal health card 10 works in connection with a number of important systems. The CPU 16 allows the personal health card to be programmed to implement the functionality described below as well as the functionality associated with smartcards in general. The memory 18 stores the executable programs and a wide range of additional information including, but not limited to, insurance policy, payment, and healthcare and prescription qualification and adjudication information for the holder of the card. The card memory may also store all or an important part of the holder's medical history and an electronic key that permits access to the holders medical records maintained on a secure medical data server, as described in U.S. Pat. No. 7,092,891.

Figure 3:
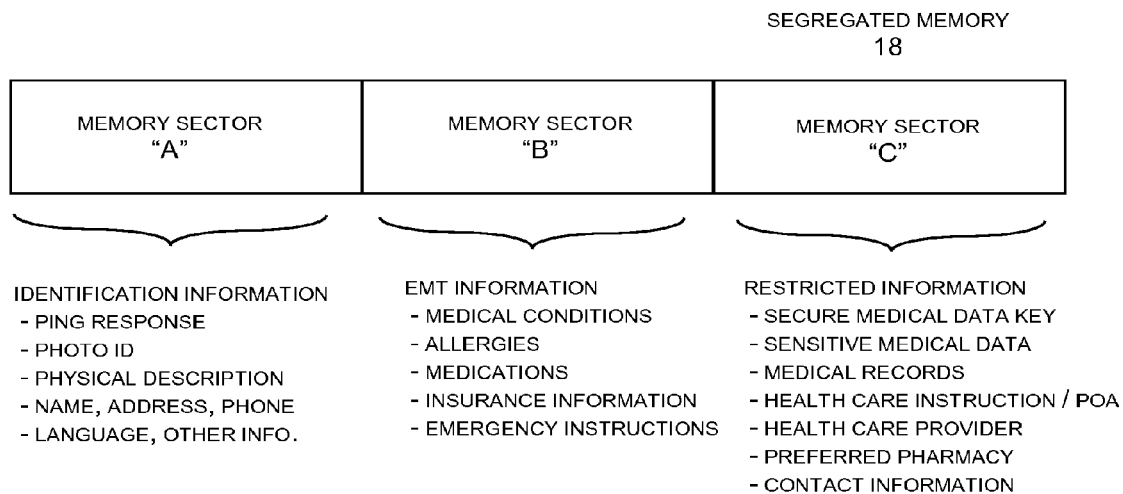
FIG. 3 is a conceptual illustration of a segregated memory on the personal health card having three memory sectors that are accessible by three different types of interrogation devices.
Figure 4:
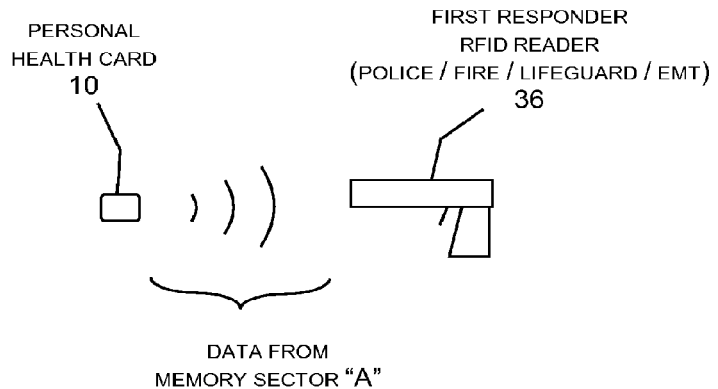
FIG. 4 is a conceptual illustration of a first responder RFID reader accessing a memory sector "A" of the segregated memory on the personal health card.

FIG. 3 is a conceptual illustration of a segregated memory 18 on the personal health card having three memory sectors that may be accessible by three different types of interrogation devices, which may also have different levels or types of security features. The memory sectors may be physically segregated or virtually segregated through software controlling access to the information contained in the memory sectors. Memory sector "A" typically includes information that can be accessed wirelessly through RFID interrogation by an authorized first responder interrogation device 36, as shown in FIG. 4. In particular, the authorized first responder interrogation device 36 may be a handheld RFID issued to authorized first responders, such as police, fire, emergency medical treatment (EMT), lifeguard, and similar personnel. This information contained in memory sector "A" readable by the authorized first responder interrogation device 36 typically includes at least a "ping response" that allows the user of the responder interrogation device to locate personal health cards 10 without having to physically find the cards first. This is an important feature because the location of a personal health card may not be readily apparent at the scene of an emergency. At a motor vehicle accident, for example, the personal health cards may be located in the victim's wallets, purses or clothing. The "ping response" allows the first respond to quickly locate the personal health cards at the emergency scene through the RFID ping response feature without having to manually search the vehicle, purses, clothing, etc. To aid in the personal health card location process, the strength "ping response" is preferably distance sensitive, for example louder when the first responder interrogation device 36 is closer to a reporting personal health card 10, to allow the first responder to home in on the specific location of the card. The interrogation device 36 preferably allows for the selection of a particular card among multiple cards that respond to an RFID interrogation signal; so that the operator of the interrogation device can select and "home-in" to physically locate one card at a time.

To further facilitate the location of the personal health card 10 issued to a particular individual, the information contained in memory sector "A" readable by the authorized first responder interrogation device 36 may also include personal identification information, such as a photo and physical description of the associated individual. To view this information, the first responder interrogation device 36 includes a display screen and appropriate controls that allow the operator of the interrogation device to toggle through and view the information available in memory sector "A" on the personal health card. The operator can then select a particular card if multiple cards respond to an interrogation signal, view the photo ID of the owner of the card on the interrogator, and use the "ping response" to home-in to physically locate the selected card. This allows the first responder to quickly locate the personal health card associated with a particular individual, which may be very helpful at the scene of an accident, injury or other emergency.

For example, at a beach or pool a lifeguard may rescue a near drowning victim who is wearing only a bathing suit and not carrying his or her personal health card 10. There may also be dozens of personal health cards in the immediate vicinity. The first responder interrogation device 36 allows the authorized first responders, such as the lifeguards or EMT technicians, to quickly scan the bags and clothing in the vicinity without physically searching the items to locate the personal health cards and view the photos and read the physical descriptions of the associated individuals. This allows the first responder to quickly find the correct personal health card 10 for the particular person needing medical attention, which can save valuable time at this extremely critical juncture. The information available in memory sector "A" may also include additional information that may be useful to the first responder interacting with the cardholder, such as the name, address, phone number, age, and language spoken by the holder of the personal health card 10.

Figure 5:
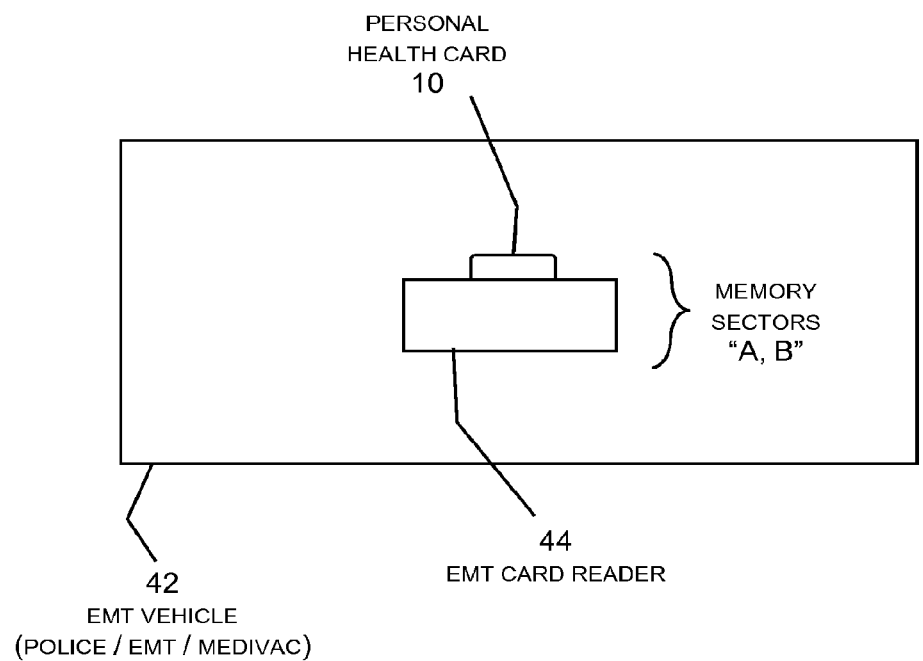
FIG. 5 is a conceptual illustration of an EMT vehicle-based RFID reader accessing memory sectors "A" and "B" of the segregated memory on the personal health card.

The segregated memory 18 carried on the personal health card 10 may also include a second level of information in a memory sector "B" pertaining to the holder of the card, which is subject to a different reading technique or higher level of security. For example, memory sector "B" may be not be readable remotely with an RFID device, but may instead be readable through the physical communication interface 18 carried on the personal health card 10. As shown in FIG. 5, for example, an authorized EMT vehicle 42 may carry a card reader 44 configured to read the information stored in memory sector "B" in addition to the information stored in memory sector "A." The information stored in memory sector "B" typically includes information that is useful when providing emergency medical treatment to the cardholder while in transit to a hospital, such as the cared holders preexisting medical conditions, blood type, medication prescriptions, and other relevant emergency treatment information. This information is typically readable on the EMT vehicle or ambulance 42 to assist the EMT personnel in providing treatment while the cardholder is in transit from the incident scene to a medical treatment facility or hospital.

The information stored in memory sector "B" may also include the cardholders medical insurance information, which the EMT vehicle transmits to the medical treatment facility for the purpose of pre-admission and preparing the medical treatment facility for the arrival of the cardholder, as described in Appendix "A." More specifically, co-pending U.S. patent application Ser. No. 09/892,184 entitled "Mobile Data Management System" describes the pre-admission process, and U.S. Pat. No. 7,092,891 entitled "Secure Medical Records Maintenance System" describes the use of information stored on the personal health card 10 to access the cardholder's medical records maintained in a secure medical records maintenance system.

Figure 6:
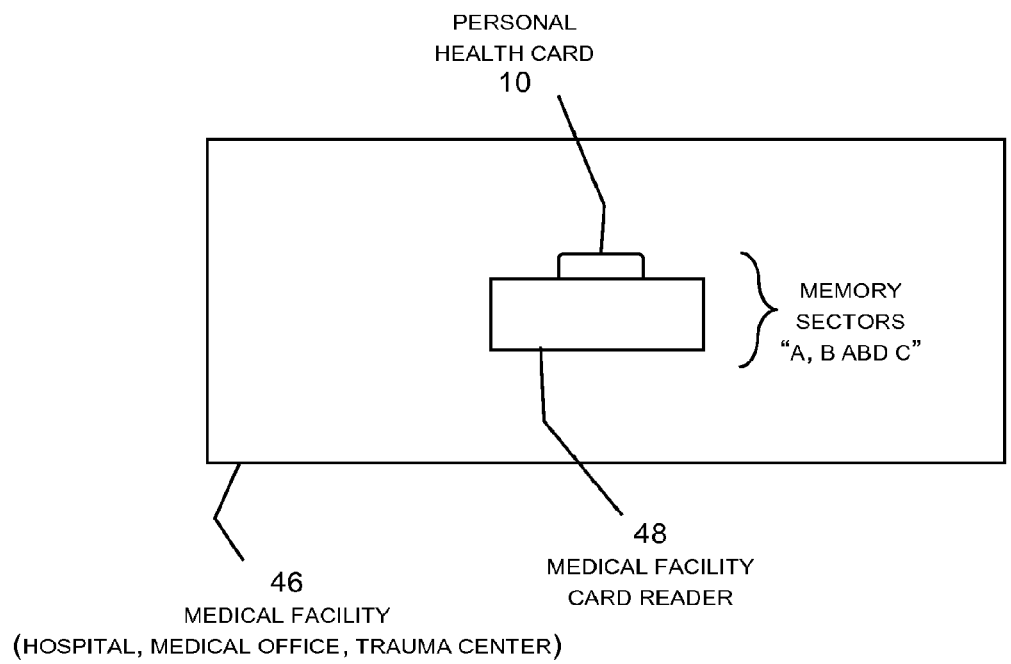
FIG. 6 is a conceptual illustration of a medical facility-based RFID reader accessing memory sectors "A," "B" and "C" of the segregated memory on the personal health card.

The segregated memory 18 carried on the personal health card 10 may also include a third level of information in a memory sector "C" pertaining to the holder of the card, which is subject to a third reading technique or higher level of security. For example, memory sector "C" may be not be readable with an RFID device or onboard an EMT vehicle, but may instead be restricted to access at an authorized medical treatment facility 46 by an authorized medical treatment facility card reader 48 as shown in FIG. 6. In particular, memory sector "A" may be readable by a first responder RFID device, memory sectors "A" and "B" may be readable may a card reader located on an authorized EMT vehicle or ambulance, and memory sectors "A" "B" and "C" may be readable may a card reader located on an authorized medical treatment facility or hospital. The highly restricted information stored in memory sector "C" may include the cardholders secure medical records or a data key that can be used to access the cardholder's secure medical records stored within a secure medical records maintenance system. Memory sector "C" may also store sensitive medical information, such as the fact that the cardholder is HIV positive, or the cardholder does or does not desire certain types of medical treatment. Memory sector "C" may also store other sensitive information useful at the hospital, such as a health care power of attorney, living will, preferred pharmacy, the patient's primary healthcare provider, next of kin contact information, and so forth.

Of course, the specific set of information in the various memory sectors, and in particular the data in memory sector "A" readable remotely with an authorized RFID device, may be tailored for specific applications and individuals. For example, each cardholder may be able to decide which information to make available in the various memory sectors as a personal choice. This decision will preferably be made by the individual cardholder in consultation with his or her medical insurance provider and/or health care provider as a matter of policy and personal choice. Given the high degree of available functionality and flexibility that can be implemented by the personal health cards, each individual will be in a position to exert a high degree of control and customization over his or her personal health card, which will serve as a single source of access to a comprehensive, personally directed and controlled healthcare system.

In addition to the hierarchical personal identification and medical treatment information stored in the segregated memory 18, the personal health card 10 may also store information relating to the cardholders insurance that facilitates insurance qualification, adjudication, fulfillment and payment. That is, the personal health card 10 stores the cardholders medical insurance identification, coverage, and fulfillment information so that the card can be used as a single source of information for medical treatment and medication prescriptions, allowing on-the-spot insurance qualification, adjudication, fulfillment and payment using the personal health card 10. For example, a physician can read the personal health card 10 and obtain all the information necessary to complete a cardholder's admission form, determine the cardholder's relevant medical conditions and history, determine what procedures are covered by the cardholder's insurance, determine what the appropriate co-pay is, charge the co-pay to the cardholder financial account associated with the personal health card, and complete the requisite insurance qualification, adjudication, fulfillment and payment process. This will greatly facilitate insurance processing, resulting in a virtually paperless, single-source, on-the-spot insurance qualification, adjudication, fulfillment and payment process.

The personal health card 10 may also be used to store a variety of other information pertaining to the cardholder, such as wellness monitoring information. In particular, the cardholder may use a variety of smartcard reader-writers to store desired information on the personal health card 10, which the cardholder can subsequently download to a personal computer or other systems for maintenance and analysis. For example, the cardholder may use the personal health card to store diet and food consumption information read from a diet compliance device or entered manually, exercise readings read from exercise machines or entered manually, prescription consumption read from a prescription dispenser and compliance device or entered manually, medical test results (e.g., blood pressure, blood cholesterol, etc.) read from medical testing devices or entered manually, and so forth. This capability further expands the functionality of the personal health card 10 as a single source for data storage, external system interface, and communication for implementing a comprehensive healthcare maintenance.

Figure 7:
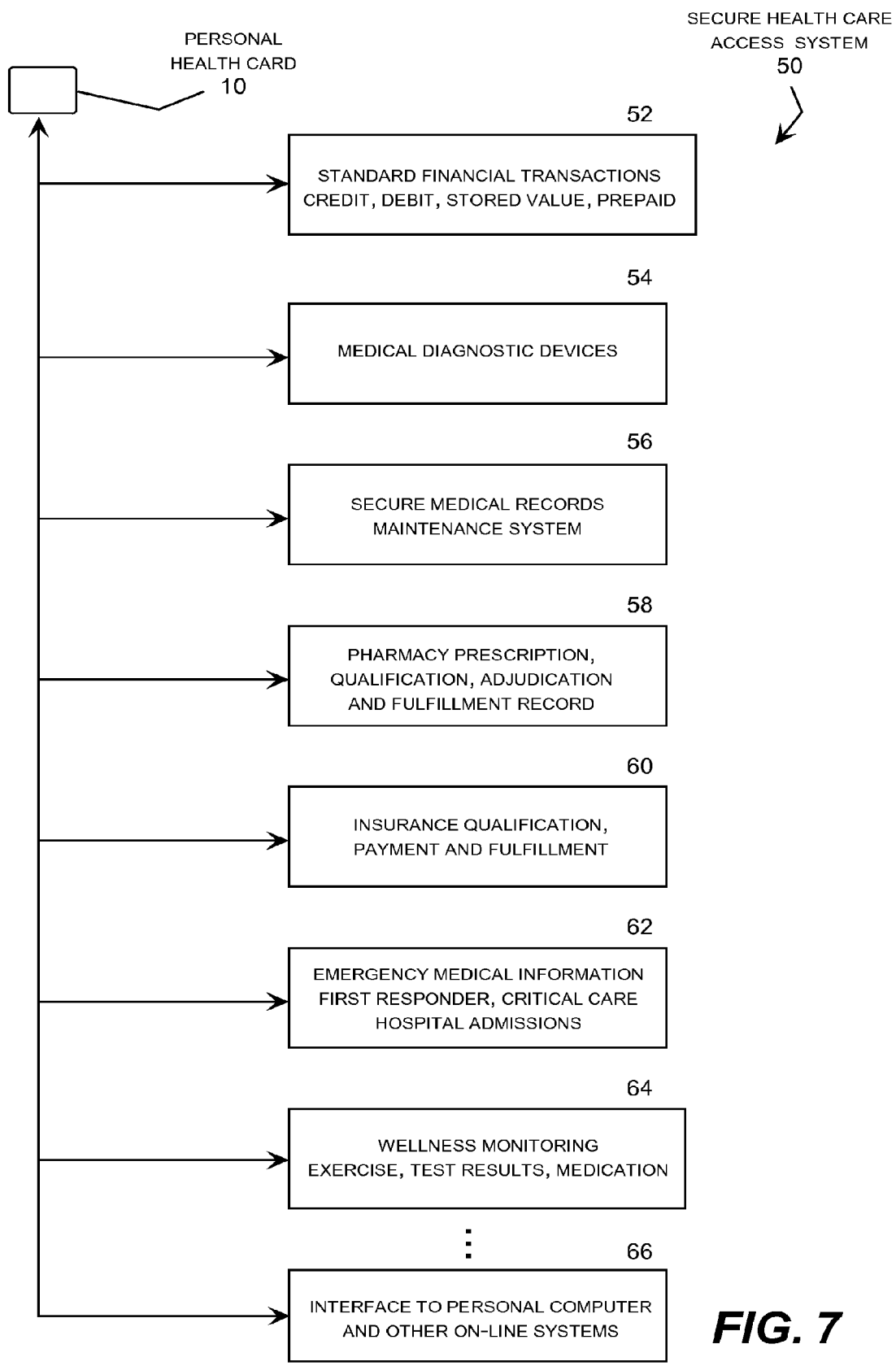
FIG. 7 is a conceptual illustration of a multi-purpose personal health card used for a number of financial and medical purposes.

FIG. 7 is a conceptual illustration of a multi-purpose personal health card 10 used for a number of financial and medical purposes. As shown in block 52, the personal health card can be used to conduct standard financial transactions. That is, the personal health card can serve as a standard credit card, debit card, stored value card, prepaid value card, gift card, or the like. The personal health card also provides the standard smartcard technology and functionality, as that technology and functionality may develop in the future. Importantly, the personal health card 10 can also be accessed remotely using the telephone circuit 40 to further enhance the functionality of the card.

As shown in block 54, the personal health card 10 can be used as a source, repository and interface for information obtained from medical diagnostic devices, such as a blood pressure testing device, a blood cholesterol testing device, more sophisticated blood chemistry devices, and the like. As shown in block 56, the personal health card 10 can be used as a source, repository and interface for a secure medical records maintenance system. As shown in block 58, the personal health card 10 can be used as a source, repository and interface for insurance information used for pharmacy prescription qualification, adjudication and fulfillment including the creation of associated records. As shown in block 60, the personal health card 10 can be used as a source, repository and interface for insurance information used for medical treatment qualification, adjudication and fulfillment including the creation of associated records. As shown in block 62, the personal health card 10 can be used as a source of information for first responder, emergency medical treatment, critical care and hospital admission information. As shown in block 64, the personal health card 10 can be used as a source, repository and interface for wellness monitoring information, such as exercise information, dietary information, medication information, and so forth. The personal health card 10 can also be used to exchange this information with personal computers and other on-line system.

Figure 8:
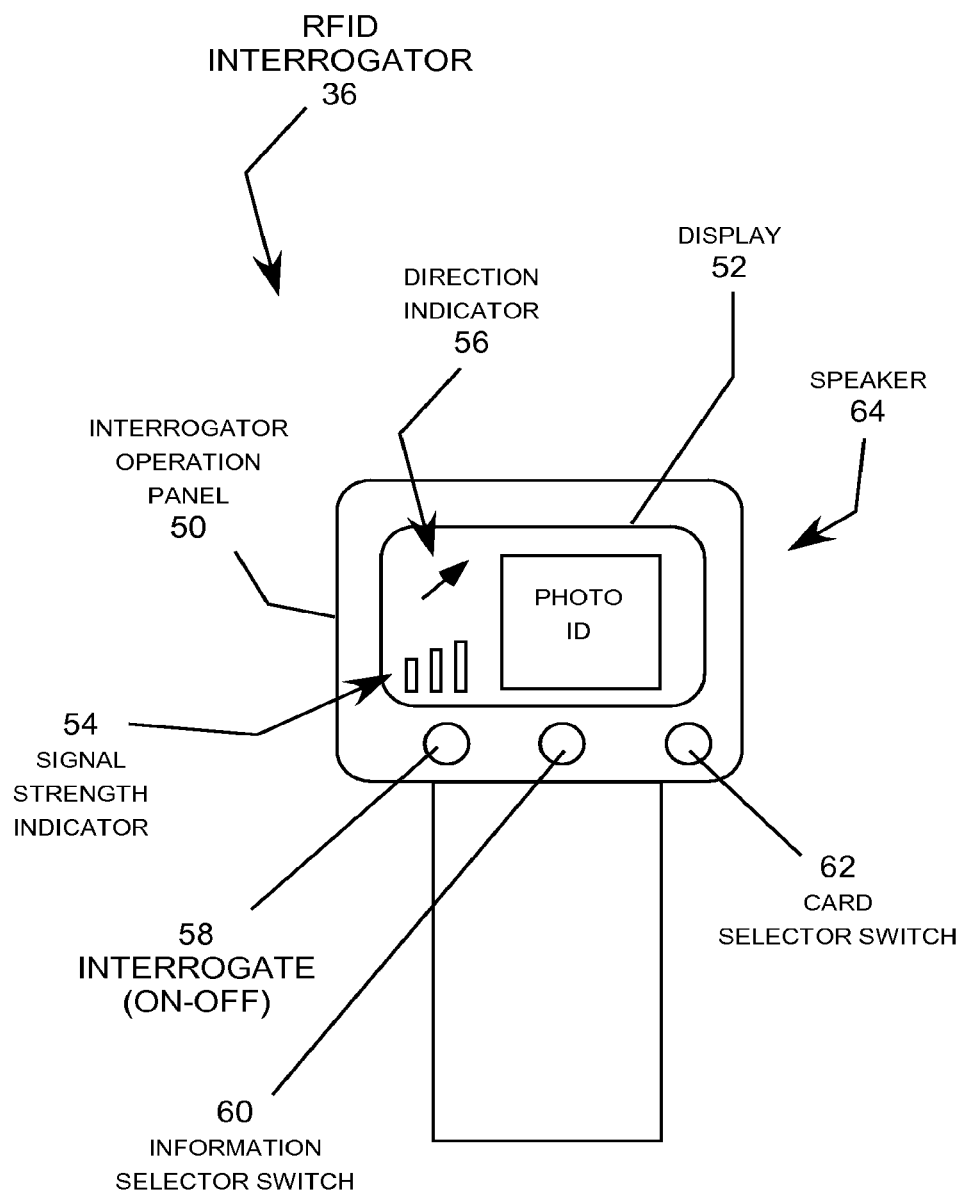
FIG. 8 is a rear view of an example RFID interrogator showing a typical operation panel located on the rear of the device.

FIG. 8 is a rear view of an example RFID interrogator 36 showing a typical operation panel 50 located on the rear of the device. The operation panel includes a set suitable of indicators, such as an LCD or other suitable display 52 for showing identification information and "homing" information for a particular health card interrogated by the RFID interrogator. For example, the illustrative display has an area for showing identification and other information received from an interrogated card, such as a photo ID of the owner stored on the card and transmitted to the interrogator in response to an interrogation signal transmitted from the interrogator. This particular operation panel also includes a strength indicator 54 and an orientation indicator 56 to show the strength and direction of the signal from the selected health card, to help guide the operator to the physical location of the card. The operation panel 50 also includes an on/off button 58, an information selector button 60 and a card selector button 62. The on/off button 58 allows the operator to turn the interrogator on and off, while the trigger (shown in FIG. 4) is typically used to activate the interrogation signal. The information selector button 60 allows the operator to toggle through information contained in memory sector "A" received from a selected card in response to the RFID interrogation, which is shown on the display 52. For example, the operator may toggle the information selector button 60 to view the owners photo ID, name and address, physical description, emergency medical information, and a preferred language spoken by the owner. The card selector button 62 allows the operator to select among multiple cards responding to a particular interrogation signal. As an illustrative example, the owner's photo ID and name displayed below the photo may be displayed as the first image upon interrogation. This will allow the operator to quickly toggle through reporting cards to locate the correct card for a particular individual. The interrogator 36 may also include a beeper or speaker 64 that provides an audible response to help the operator home in on a selected card. Of course, these details are merely illustrative, and the operation panel of the interrogator may be configured differently as a matter of design choice.

In view of the foregoing, it will be appreciated that present invention provides significant improvements for implementing a multi-purpose personal health card with RFID information reporting functionality.

The invention clamed is:

1. A personal health card, comprising
a portable substrate comprising:
    a physical communication interface,
    a wireless communication circuit;
    a mobile telephone circuit;
    a memory comprising a first and second sector wherein:
        the first sector stores first sector information comprising an image of the user,
        the second sector stores second sector information comprising medical information associated with the user comprising a data key for the instrument holder that can be used to access the instrument holder secure medical records stored within a secure medical records maintenance server, and
        the first sector is segregated from the second sector;
    a processor configured to:
        provide the first sector information but not the second sector information through the wireless communication circuit in response to a first type of interrogation having a first type of authority from a wireless reader,
        provide the second sector information through the physical communication interface in response to interrogation having a second type of authority from a card reader, and
        deactivate the personal health card in response to receiving a signal through the mobile telephone circuit.

2. The personal health card of claim 1 wherein:
the memory further stores medical insurance information associated with the user.

3. The personal health card of claim 1, wherein the first sector information further comprises a name, address, phone number, age, or language spoken by the instrument holder.

4. The personal health card of claim 1, wherein:
the wireless reader comprises a first responder interrogator assigned to emergency response personnel; and
the card reader comprises an interrogator carried onboard an emergency transport vehicle.

5. The personal health card of claim 1, wherein the second sector information comprises medical records for the instrument holder.

6. The personal health card of claim 2 wherein the medical insurance information associated with the user comprises medical insurance identification, coverage, qualification, adjudication, and fulfillment information.

7. The personal health card of claim 1 wherein the memory further stores financial account information configuring the health information instrument to function as a financial payment instrument.

8. The personal health card of claim 1 wherein the wireless communication circuit is further configured to receive information from a medical device and the electronic memory is configured to store the received information.

9. The personal health card of claim 1 further comprising a GPS circuit.

10. The personal health card of claim 1 further configured to be accessed remotely.

* * * * *